United States Patent [19]

Akutagawa et al.

[11] Patent Number: 4,817,458
[45] Date of Patent: Apr. 4, 1989

[54] BELT-PULLEY TYPE STEPLESSLY VARIABLE TRANSMISSION ASSEMBLY

[75] Inventors: Hitoshi Akutagawa; Masayoshi Shigemasa, both of Hiroshima, Japan

[73] Assignee: Mazda Motor Corporation, Hiroshima, Japan

[21] Appl. No.: 90,514

[22] Filed: Aug. 28, 1987

[30] Foreign Application Priority Data

Aug. 29, 1986 [JP] Japan .................................. 61-202898
Feb. 16, 1987 [JP] Japan .................................. 62-32951

[51] Int. Cl.$^4$ .............................................. F16H 37/06
[52] U.S. Cl. .................................... 74/665 GE; 74/701
[58] Field of Search ................ 74/665 GE, 689, 700, 74/701, 339, 694, 867; 474/1, 7

[56] References Cited

U.S. PATENT DOCUMENTS

| 4,241,618 | 12/1980 | Smirl | 74/689 X |
| 4,294,137 | 10/1981 | Piret et al. | 74/665 GE X |
| 4,433,594 | 2/1984 | Smirl | 74/694 X |
| 4,529,393 | 7/1985 | Makishima | 74/689 X |
| 4,548,100 | 10/1985 | Hohn | 74/665 GE X |
| 4,558,607 | 12/1985 | Szodfridt | 74/339 |
| 4,610,183 | 9/1986 | Nobumoto et al. | 74/866 |
| 4,665,773 | 5/1987 | Hiramatsu et al. | 74/867 |
| 4,665,775 | 5/1987 | Nagamatsu et al. | 74/868 |
| 4,671,138 | 6/1987 | Nobumoto et al. | 74/862 |
| 4,671,140 | 6/1987 | Koshio | 74/868 |
| 4,673,377 | 6/1987 | Akutagawa | 474/1 |
| 4,736,652 | 4/1988 | Shimamoto | 74/665 GE |

FOREIGN PATENT DOCUMENTS

| 0119935 | 9/1984 | European Pat. Off. | 474/1 |
| 0017060 | 1/1984 | Japan | 474/1 |
| 60-164061 | 8/1985 | Japan . | |
| 2025545 | 1/1980 | United Kingdom | 74/689 |

Primary Examiner—Dirk Wright
Assistant Examiner—David Novais
Attorney, Agent, or Firm—Fleit, Jacobson, Cohn & Price

[57] ABSTRACT

A steplessly variable transmisison system for a vehicle, having a belt-pulley type transmission. An input shaft of the transmission consists of first and second shaft portions. A sleeve member is provided and is slidably splined on the first shaft portion. A driven gear is provided on the second shaft portion which is engageable with the sleeve member by a synchronizer mechanism. A reverse gear mechanism is also provided, the reverse gear of which is engageable with an outer gear formed on the circumference of the sleeve member. The sleeve member is slid by a shaft fork to thereby selectably engage the first shaft portion with the second shaft portion through either the synchronizer mechanism or the reverse gear mechanism. By selecting the engagement through the synchronizer mechanism, a forward driving transmission is implemented, whereas, by selecting the engagement through the reverse gear mechanism, a reverse driving transmission is implemented.

9 Claims, 4 Drawing Sheets

BELT-PULLEY TYPE STEPLESSLY VARIABLE TRANSMISSION ASSEMBLY

BACKGROUND OF THE INVENTION

1. Cross Reference

U.S. Pat. Nos. 4,673,377, 4,665,775, 4,610,183, and 4,671,140. U.S. patent application Ser. Nos. 665,84 now abandoned and 665,043 now U.S. Pat. No. 4,671,138.

2. Field of the. Invention

The present invention relates to a vehicle power transmission and more particularly to a belt-pulley type steplessly variable transmission. More specifically, the present invention pertains to a belt-pulley type steplessly variable transmission having a novel forward-reverse drive selecting mechanism.

3. Description of Prior Art

It has been proposed to use a belt-pully type transmission for automobile driving systems. In such driving systems it is required to provide the transmission with a selecting mechanism which selectably transmits the engine rotation in either a forward or a reverse direction. Such a selecting mechanism is disclosed, for example, in Japanese Patent Public Disclosure No. 60-164061, wherein two synchronizer mechanisms are used to transmit the engine rotation in a forward and a reverse direction. That is, an input shaft member of the transmission is arranged to engage with a reverse gear through a gear train. An output shaft of the transmission is axially arranged with the input shaft and between the shafts are provided two synchronizer mechanisms, one for engaging the input shaft directly with the output shaft and the other for engaging the output shaft with the reverse gear. In this type of selecting mechanism the reverse gear and the associated gear train are always engaged with the rotating input shaft to be in a driving condition. Therefore, under forward transmission at high speed, friction becomes high between the rotating portions in the reverse gear and the associated gear train, which causes loss in driving force. In addition, provision of two synchronizer mechanisms tends to make the overall system bulky as well as complicated.

Another type of selecting mechanism is disclosed in U.S. Pat. No. 4,529,393, in which a single synchronizer mechanism is provided to transmit the engine rotation in a forward direction. An idle gear is provided to be engaged with a gear on the synchronizer and with a counter gear so as to provide a reverse drive transmission. In this system the synchronizer ring and the idle gear must be shifted in order to select forward and reverse drive transmission, and so the shifting mechanism tends to become complicated.

It has been known that, in an automobile driving system having the above-mentioned type of transmission system, a hydraulic clutch means such as a torque converter and a fluid coupling is provided .between the output member of an engine and the input member of the transmission system. This type of system is preferably provided with a neutral clutch means such as a multiple plate type clutch so that transmission of the engine power can be interrupted to thereby carry out the selecting operation of the transmission system smoothly. Especially, transmission systems without a synchronizer mechanism for a reverse drive transmission such as in U.S. Pat. No. 4,529,393 require the neutral clutch means in order to secure the smooth selecting operation. The provision of the neutral clutch causes to increase the length of the transmission system, which means an increase in the width of the overall engine having such transmission system. This goes against the requirement that the width of the overall engine should be made as narrow as possible in the case it is mounted transversely in an automobile vehicle of the front-drive, front-engine type.

SUMMARY OF THE INVENTION

It is therefore an object of the present invention to provide a belt- pulley type steplessly variable transmission having a selecting mechanism for transmitting the engine rotation in a forward and a reverse direction, in which the selecting mechanism is compact and simple in its structure and whereby power loss therethrough can be decreased.

Another object of the present invention is to provide a belt-pulley type steplessly variable transmission having a forward-reverse drive selecting mechanism and a multiple plate type neutral clutch means between the selecting mechanism and the output of an engine, in which the connecting portion between the selecting mechanism and the clutch means can be compactly assembled to thereby suppress the increase in the length of the overall transmission due to the provision of the clutch means.

According to the present invention, the above and other objects can be accomplished by a steplessly variable transmission system comprising; a belt-pully type transmission having an input shaft carrying driving pulley means of a variable effective diameter, an output shaft carrying driven pulley means of a variable effective diameter and belt means connecting the driving and driven pulley means so that power can be transmitted between the driving and driven pulley means, said input shaft being divided into a first shaft portion connected with the output member of an engine and a second shaft portion having mounted thereon said driving pulley means; a driven gear fixedly mounted on one end of said second shaft portion facing said first shaft portion; a reverse gear mechanism having a reverse counter shaft arranged parallel to said input shaft, a reverse counter gear mounted on one nd of said reverse counter shaft at the side of said second shaft portion, a reverse idle gear engaged with said reverse counter gear and with said driven gear, a reverse gear mounted on the other end of said reverse counter shaft at the side of said first shaft portion; a sleeve member splined on said first shaft portion at one end facing said second shaft portion so that it is slidable in an axial direction of said input shaft; an outer gear formed on the circumference of said sleeve member which is engageable with said reverse gear; and a synchronizer mechanism provided between said sleeve member and said driven gear for synchronizing rotations between said sleeve member and said driven gear to accomplish a connection therebetween.

The sleeve member can be shifted along the input shaft by means of a shift fork connected thereto so that it can be shifted to at least two positions, one for forward drive mode and the other for reverse drive mode. When the sleeve member is shifted to the forward drive position, the first shaft portion of the input shaft is directly connected to the driven gear of the second shaft portion through the synchronizer mechanism to provide forward drive transmission. When it is shifted to the reverse drive position, the outer gear of the sleeve member is in engagement with the reverse gear of the reverse gear mechanism to provide reverse drive transmission.

According to the present invention, by the shifting operation of the sleeve member, both the forward and reverse driving transmission can be obtained without the a provision of a synchronizer mechanism for selecting the reverse driving transmission. Therefore, the construction of the transmission mechanism can be compact and simplified. In addition, power loss can be reduced through the transmission mechanism.

When the transmission mechanism is applied to an automobile, the first shaft portion may be a part of or connected with a fluid coupling which transmits the engine power to the transmission mechanism. In a preferred embodiment, the first shaft portion of the input shaft is provided with a neutral clutch means between the engine side and the sleeve side, which is used for interrupting the transmission of the engine power to the sleeve side of the first shaft portion, when the sleeve member is shifted to engage the outer gear thereon with the reverse gear so as to provide a reverse driving mode. The neutral clutch means can be a multiple plate type clutch. A driven hub of the clutch and an input element for the sleeve member can be a pre-assembled part. According to this configuration, there is no need to provide connecting means between the driven clutch hub and the input element.

The above and other objects and features of the present invention will become apparent from the following description of the preferred embodiments with reference to the accompanying drawings.

BRIEF DESCRIPTION OF THE DRAWINGS

FIG. 4 a enlarged partial sectional view of the transmission as shown in FIG. 3, mainly showing a synchronizer mechanism;

FIG. 5 is a sectional view of a clutch hub assembly of the shown in FIG. 3; and, FIG. 6 is a sectional view taken along the line A—A in FIG. 5.

DESCRIPTION OF THE PREFERRED EMBODIMENTS

While the present invention will be described with reference to specific embodiments, the present invention is not to be considered limited to them. On the contrary, the present invention includes all modifications, alternations and equivalents so long as they are within the scope or range of the invention as defined by the attached claims.

Figure 1:
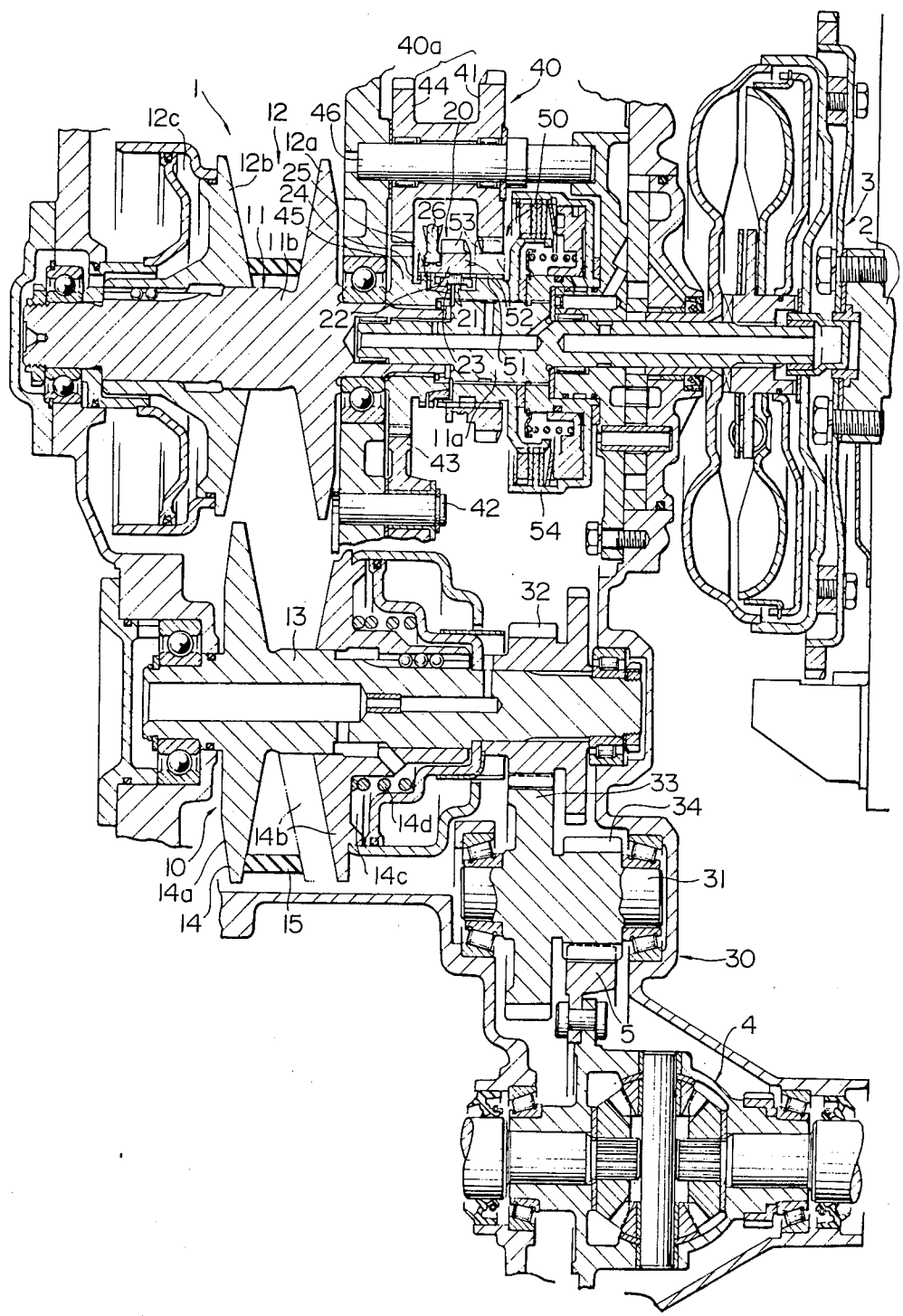
FIG. 1 is a sectional view of a transmission mechanism in accordance with one embodiment of the present invention.
Figure 2:
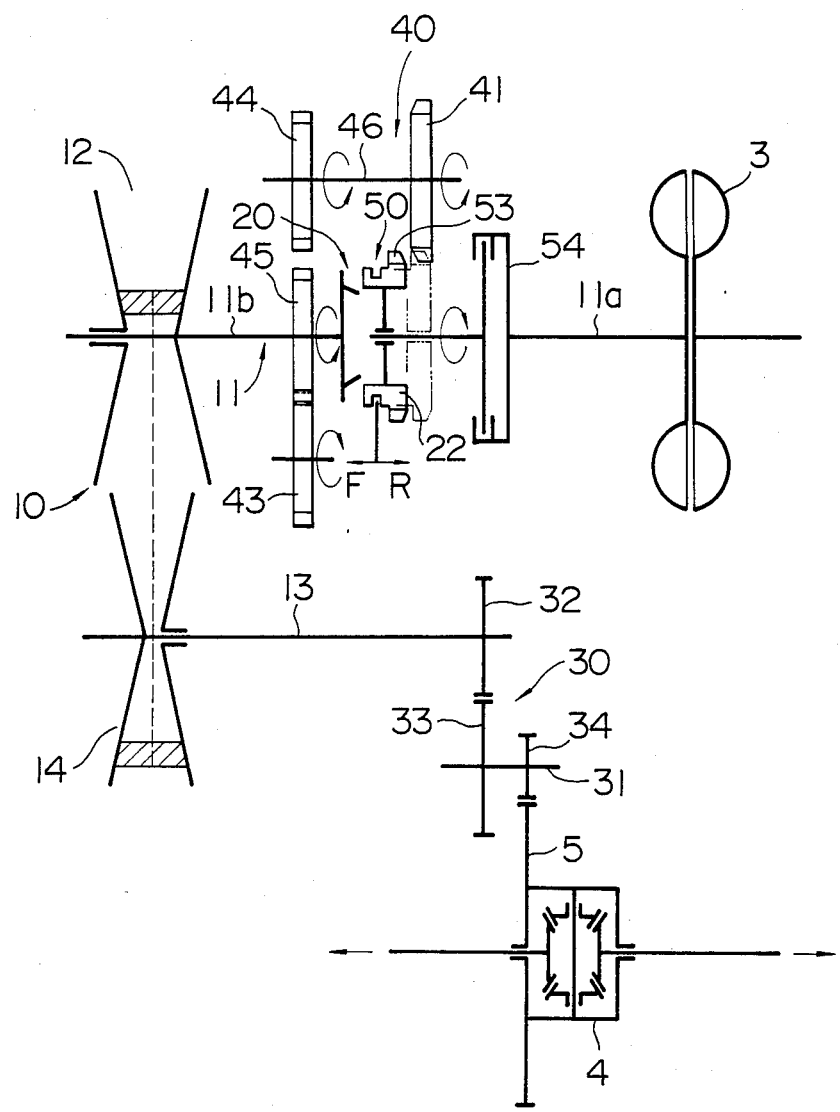
FIG. 2 shows a skeleton of the transmission mechanism as shown in FIG. 1.
Figure 3:
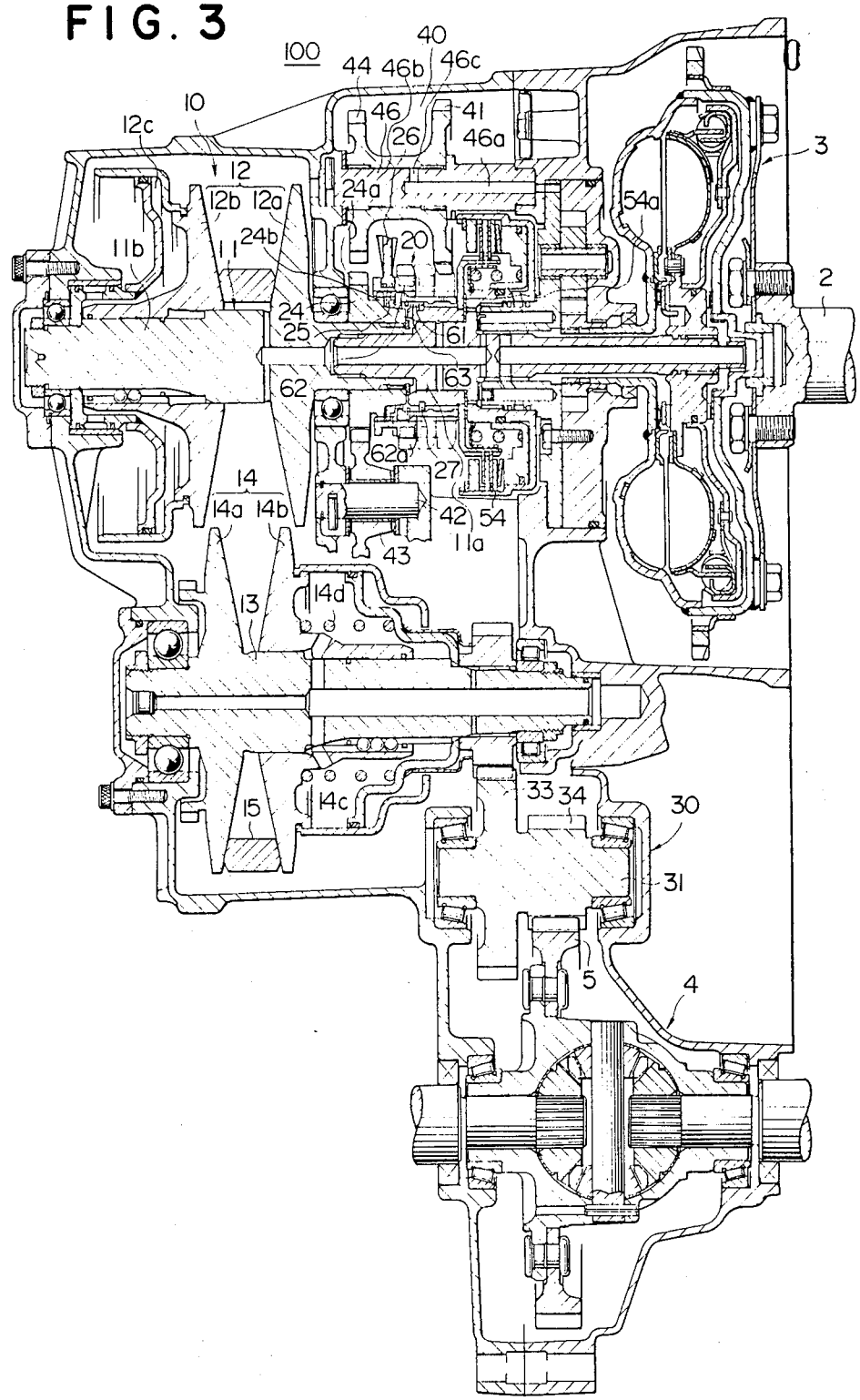
FIG. 3 is a sectional view of a transmission mechanism in accordance with another embodiment of the present invention.

Referring now to the drawings, especially to FIGS. 1 and 2, there is shown an embodiment of the transmission mechanism in accordance with the present invention. The transmission mechanism 1 is disposed between the output member 2 of an engine ( not shown ) and a differential gear device 4 and transmits the engine power from the output 2 therethrough to the differential gear device 4. The transmission mechanism 1 has a power clutch in the form of a fluid coupling 3 connected with the output member 2 of the engine. The transmission mechanism 1 comprises mainly a steplessly variable transmission assembly 10, an output gear mechanism 30, and a reverse gear mechanism 40. The steplessly variable transmission mechanism 10 is of a belt-pulley type and includes a driving pulley assembly 12 and a driven pulley assembly 14 which are connected together by an endless belt 15. The driving pulley assembly 12 includes a fixed disc 12$a$ having an input shaft 11 integrally formed therewith and a movable disc 12$b$ mounted on the input shaft 11 for axially slidable movement with respect to the fixed disc 12$a$. The input shaft is arranged coaxially with the clutch 3. The discs 12$a$ and 12$b$ have frustoconical side surfaces which face with each other to define therebetween a circumferential groove of a substantially V-shaped cross-section. The driven pulley assembly 14 comprises a fixed disc 14$a$ having an output shaft 13 integrally formed therewith and a movable disc 14$b$ mounted on the output shaft 13 for axially slidable movement with respect to the fixed disc 14$a$. The discs 14$a$ and 14$b$ have frustoconical side surfaces which face each other to define a circumferential groove of a substantially V-shaped cross-sectional configuration. The endless belt 15 is engaged with the circumferential grooves in the driving and driven pulley assemblies 12 and 14 to transmit driving power from the driving pulley assembly 12 to the driven pulley assembly 14. In order to determine the axial position of the movable disc 12$b$, there is provided a hydraulic pressure chamber 12$c$ behind the movable disc 12$b$. The movable disc 12$b$ is moved according to the hydraulic pressure applied in the pressure chamber 12$c$ with respect to the fixed disc 12$a$ so that it changes the effective diameter of the pulley assembly 12. Hence, by changing the applied pressure in the chamber 12$c$ according to the driving conditions, the speed ratio of the transmission can be varied. There is also provided a hydraulic pressure chamber 14$c$ behind the movable disc 14$b$, in which a spring is disposed. The force of the spring 14$d$ and the hydraulic pressure induced into the pressure chamber 14$c$ moves the movable disc 14$b$ toward the fixed disc 14$a$. Thus, the spring 14$d$ and the pressure in the chamber 14$c$ determine the tension of the belt 15.

The input shaft 11 consists of two shaft portions coaxially arranged with each other. A first shaft portion 11$a$ is a part of the output member of the clutch 3 or is connected therewith, while a second shaft portion 11$b$ is integrally formed with the fixed disc 12$a$ of the driving pulley assembly 12. A reverse gear mechanism 40 is disposed around the connecting portion between the first and second shaft portions. The reverse gear mechanism 40 comprises a driven gear 45 fixedly mounted on the second shaft portion 11$b$ at the end facing the first shaft portion 11$a$ and an reverse idle gear 43 mounted on an idle shaft extending parallel to the input shaft 11, the reverse idle gear 43 being in engagement with the driven gear 45. The reverse gear mechanism 40 comprises a reverse counter shaft 46 arranged parallel to the input shaft 11 and extending from the first input shaft portion 11$a$ to the second input shaft portion 11$b$. A gear assembly 40$a$ is rotatably mounted on the reverse counter shaft 46 and comprises a reverse counter gear 44 at the end confronting the reverse idle gear 43 which is engaged therewith. The gear assembly 40$a$ also comprises a reverse gear 41 at the opposite end adjacent to the first shaft portion 11$a$.

A first selecting mechanism 20 is provided between the first and second shaft portions 11$a$ and 11$b$, which selectably connects and disconnects therebetween.

Where the shaft portions 11a and 11b are connected directly through the first selecting mechanism 20, the engine rotation is transmitted in a forward direction therethrough to form a forward driving mode. A second selecting mechanism 50 is provided between the first input shaft portion 11a and the reverse gear mechanism 40 which selectably connects and disconnects the first shaft portion 11a and the second shaft portion 11b through the reverse gear mechanism 40. By connection of the first and second shaft portions 11a and 11b through the reverse gear mechanism 40, the engine rotation is transmitted in a reverse direction through the transmission to form a reverse driving mode. On the other hand, between the second selecting mechanism 50 and the first shaft portion 11a, there is provided a neutral clutch means 54 of a multiple plate type which is actuated to disconnect the first shaft portion 11a from the second selecting mechanism 50, so that the connecting operation between the first shaft portion 11a and the reverse gear 41 performed by the second selecting mechanism 50 can be carried out smoothly.

The first selecting mechanism 20 comprises a synchronizer mechanism which has a clutch hub 21, a sleeve 22 splined to the clutch hub 21, a key disposed between the clutch hub and the sleeve, a splined gear 24 fixedly mounted on the end of the second shaft portion and engaeable with internal spline teeth formed on the sleeve 22, and a synchronizer ring 25 engaged with a conical boss formed on the gear 24. The synchronizer mechanism may be a well known type which is widely used in gear shift mechanisms of conventional vehicle transmission gear systems. The sleeve 22 is engaged with a shift fork 26, by which it is axially slid to travel between a disengaged position shown by the phantom line in FIG. 1 and an engaged position shown by the solid line in FIG. 1. As the sleeve 22 is moved toward the engaged position ( toward the left side of FIG. 1), the key 23 forces the synchronizer ring 25 against the conical surface of the splined gear 24 to thereby synchronize the rotations of the spline 24 and the clutch hub 21. After attaining the synchronized condition, the sleeve 22 is firmly connected to the splined gear 24. As a result, the first shaft portion 11a is directly connected to the second shaft portion, that is, the forward driving mode is implemented.

The second selecting mechanism 50 comprises spline teeth 51 formed integrally at the position of the clutch hub 21 where the reverse gear faces, and a drive gear 52 formed integrally with the sleeve 22 and axially slidable with the sleeve 22 along the clutch hub 21. The drive gear 52 is provided on the inner surface with inner spline teeth aligned with the those formed on the inner surface of the sleeve 22. The drive gear 52 is also provided on the outer surface with outer gear teeth 53. When the sleeve 22 is slid to its disengaged position shown by the phantom line , the drive gear is also moved together with the sleeve 22 to a position between the spline teeth 52 and the reverse gear 41 of the reverse gear mechanism 40 so that the inner spline teeth are engaged with the spline 51, while the outer gear 53 is engaged with the reverse gear 41. As a result, the first shaft portion 11a is connected through the reverse gear mechanism 40 to the second shaft portion 11b to thereby transmit the engine rotation in a reverse direction through the transmission. As described above, the engagement operation is carried out after the neutral clutch 54 is actuated to disconnect the first shaft portion 11a and the second selecting mechanism 50, and so the said operation can be performed smoothly.

The output shaft 13 on which is mounted the driven pulley assembly 14 is connected through the output gear mechanism 30 to the differential gear device 4. The output gear mechanism 30 comprises a gear 32 fixedly mounted on the output shaft 13 and a gear 33 formed integrally on an intermediate shaft extending parallel to the shaft 13, the gears 32 and 33 being engaged with each other. The intermediate shaft 31 is also integrally formed with an output gear 34 which is engaged with a final gear 5 of the differential device 4.

In operation, when the sleeve 22 is moved by the shift fork 26 to the engaged position shown by the solid line, the first shaft portion 11a is directly connected through the first selecting mechanism 20 with the second shaft portion 11b, while the drive gear 52 is also moved with the sleeve 22 so that the first shaft portion 11a is in a disconnected condition with the reverse gear mechanism 40. Hence, the forward driving mode is implemented. Whereas, when the sleeve 22 is moved to the disengaged position as shown by the phantom line, the drive gear 52 is moved into the engagement position instead of the sleeve 22, so that the first shaft portion 11a is connected this time through the second selecting mechanism 50 to the reverse gear mechanism 40. Since the reverse counter gear 44 of the reverse gear mechanism is in engagement with the driven gear on the second shaft portion 11b, the first shaft portion 11a is engaged through the reverse gear mechanism 40 to the second shaft portion 11b, so that the reverse driving mode is obtained.

Referring now to FIGS. 3 to 6, there is shown another embodiment of the present invention, which is a modification of the above-mentioned transmission mechanism. The same numerals are used to denote the elements which are similar to those in the above embodiment, and the description thereof is omitted. The transmission mechanism 100 includes a first selecting mechanism 20 for selecting a forward drive mode and a second selecting mechanism 50 for selecting a reverse drive mode. A neutral culuch 54 of the multiple plate type is provided adjacent to the second selecting mechanism 50 at the side of a hydraulic clutch means 3. As can best be seen in FIG. 4, there is provided an annular-shaped gear hub 61 which is secured on the end of the first shaft portion 11a. The clutch 54 comprises a driven hub 54a which is secured on the gear hub 21 at its end facing the clutch 54. On the outer surface of the gear hub 61, an annular-shaped gear sleeve 62 is splined through a synchronizer key 63 disposed therebetween. The gear sleeve 62 is provided on the outer surface with an outer gear 62a engageable with a reverse gear 41 of the reverse gear mechanism 40. A gear hub 24 having a driven gear 24a is fixedly mounted on the second shaft portion 11b, the driven gear being engaged with an idle gear 43. A spline gear 24b is formed on the gear hub at the end facing the first shaft portion 11a, which is engageable with spline teeth formed on the inner surface of the gear sleeve 62. A conical surface is formed on the gear hub adjacent to the spline gear 24b, with which a synchronizer ring 25 is engaged. A shift fork 26 is engaged with the gear sleeve 62 to slide axially to be positioned at one of a neutral, forward and reverse positions N, D and R ( shown in FIG. 4 ).

The assembly of the gear hub 61 and the driven hub 54a is illustrated in FIG. 5. The gear hub is forged of sintered alloy, while the driven hub 54a is press-formed.

The driven hub 54a is substantially clyinder-shaped, opening at one end. An annular opening 54b is formed at the closed end of the driven hub 54a. The gear hub 61 has a boss 61a formed on its one end which is fixedly inserted into the annular opening 54b and connected therewith by means of a sintering process. Owing to this structure, a key spring 64 for supporting the synchronizer keys 63 cannot be assembled around the gear hub 61 from the end of the clutch hub 54a. According to the present embodiment, an annular groove 61b is formed on the outer surface of the gear hub 61 so that the key spring 64 can be inserted therein radially from outside the gear hub 61 as shown by the arrow in FIG. 6. Accordingly, the assembly of the key spring 64 can easily be carried out.

In operation, when the gear sleeve 62 is moved by the shift fork 26 to the forward position D, the synchronizer ring 25 is forced by the synchronizer key 62 against the conical outer surface of the gear hub 24, so that the rotation of the spline gear 24a is synchronized with that of the gear sleeve 62. Although the synchronizer keys 63 are urged by the key spring 64 radially outward, they are urged by the gear sleeve 62 radially inward and also toward the spline gear 24b after the synchronization is obtained. Thus, the gear sleeve 62 comes into engagement with the spline gear 24b to thereby connect the first and second shaft portions 11a and 11b. Hence, the forward driving mode is implemented. Whereas, when the gear sleeve 62 is moved into the reverse position R, the outer gear 62a comes into engagement with the reverse gear 41 to thereby connect the first shaft portion 11a through the reverse gear mechanism 40 to the second shaft portion 11b. Thus, the reverse driving mode is implemented. When the gear sleeve is moved into the neutral position N, the first shaft portion 11a is disconnected from both the spline gear 24b and the reverse gear 41.

We claim:

1. A steplessly variable transmission system comprising: a belt-pulley type transmission having an input shaft carrying driving pulley means of a variable effective diameter, an output shaft carrying driven pulley means of a variable effective diameter and belt means connecting the driving and driven pulley means so that power can be transmitted between the driving and driven pulley means, said input shaft comprised of a first shaft portion connected with an output member of an engine and a second shaft portion on which is mounted said driving pulley means; a driven gear fixedly mounted on one end of said second shaft portion facing said first shaft portion; a reverse gear mechanism having a reverse counter shaft arranged parallel to said input shaft, a reverse counter gear mounted on one end of said reverse counter shaft at the side of said second shaft portion having a fixed position relative to said second shaft portion, a reverse idle gear rotatable around an axis parallel to said input shaft and said reverse counter shaft, said reverse idle gear being always engaged to both said reverse counter gear and said driven gear, a reverse gear mounted on the other end of said reverse counter shaft at the side of said first shaft portion; a sleeve member splined on said first shaft portion at one end facing said second shaft portion so that it is slidable in an axial direction of said input shaft; an outer gear formed on the periphery of said sleeve member which is engageable only with said reverse gear; and a synchronizer mechanism provided between said sleeve member and said driven gear for synchronizing rotations between said sleeve member and said driven gear for connecting therebetween; said sleeve member being slidable axially of said input shaft to a first position at the side of said second input shaft portion wherein it is connected with said driven gear through said synchronizer mechanism and said outer gear thereof is disconnected from said reverse gear, and to a second position at the side of said first input shaft portion wherein said outer gear is connected with said reverse gear and the sleeve member is disconnected from said driven gear.

2. The transmission system as set forth in claim 1, wherein spline grooves for the spline coupling between said sleeve member and said input shaft are provided along the traveling range of said sleeve member, and a shift fork means is connected wit said sleeve member at a position between said reverse counter gear and said reverse gear to slide said sleeve member along said spline grooves.

3. The transmission system as set forth in claim 2, wherein at least one part of said spline grooves is located on the part of said input shaft facing said reverse gear.

4. The transmission mechanism as set forth in claim 1, further comprising a neutral clutch means provided between a portion of said input shaft on which said sleeve means is provided and the output member on an engine.

5. The transmission system as set forth in claim 1, wherein said first shaft portion of the input shaft is connected through a hydraulic clutch means to the output member of the engine.

6. The transmission system as set forth in claim 5, wherein an output member of said hydraulic clutch means is connected through a neutral clutch means to said sleeve member.

7. A steplessly variable transmission system comprising: a belt-pulley type transmission having an input shaft carrying driving pulley means of a variable effective diameter, an output shaft carrying driven pulley means of a variable effective diameter and belt means connecting the driving and driven pulley means so that power can be transmitted between the driving and driven pulley means, said input shaft comprised of a first shaft portion connected with an output member of an engine and a second shaft portion on which is mounted said driving pulley means; a driven gear fixedly mounted on one end of said second shaft portion facing said first shaft portion; a reverse gear mechanism having a reverse counter shaft arranged parallel to said input shaft, a reverse counter gear mounted on one end of said reverse counter shaft at the side of said second shaft portion, a reverse idle gear engaged with said reverse counter gear and with said driven gear, a reverse gear mounted on the other end of said reverse counter shaft at the side of said first shaft portion; a sleeve member splined on said first shaft portion at one end facing said second shaft portion is slidable axially of said input shaft; an outer gear formed on the circumference of said sleeve member engageable with said reverse gear; a synchronizer mechanism provided between said sleeve member and said driven gear for synchronizing rotations between said sleeve member and said driven gear for connecting therebetween; a neutral clutch means provided between a part of said input shaft portion on which said sleeve member is provided and the output member of an engine; a gear hub securely mounted on said input shaft portion and having spline groove on its periphery, on which said sleeve member is slidably splined, and said gear hub and a driven hub of said neutral clutch means being a pre-assembled part.

8. The transmission system as set forth in claim 7, wherein said gear hub is provided with an annular-shaped groove formed on its outer surface so as to insert a key spring therein from a radially outside direction of the gear hub, said key spring being provided for supporting a synchronizer key around said gear hub.

9. The transmission system as set forth in claim 7, wherein said gear hub and said driven hub are separately manufactured to assemble with each other integrally.

* * * * *